(12) United States Patent
Kowalski et al.

(10) Patent No.: US 10,081,109 B2
(45) Date of Patent: Sep. 25, 2018

(54) HAPTIC TEACH PENDANT

(71) Applicant: Fanuc America Corporation, Rochester Hills, MI (US)

(72) Inventors: Gary Kowalski, Denver, NC (US); Matthew F. Denio, Clarkston, MI (US); H. Dean McGee, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 14/018,914

(22) Filed: Sep. 5, 2013

(65) Prior Publication Data

US 2014/0067128 A1     Mar. 6, 2014

Related U.S. Application Data

(60) Provisional application No. 61/697,600, filed on Sep. 6, 2012.

(51) Int. Cl.
| | |
|---|---|
| *B25J 13/06* | (2006.01) |
| *B25J 9/16* | (2006.01) |
| *G05B 19/409* | (2006.01) |

(52) U.S. Cl.
CPC ............. *B25J 13/06* (2013.01); *B25J 9/161* (2013.01); *G05B 19/409* (2013.01); *G05B 2219/36162* (2013.01); *G05B 2219/40132* (2013.01)

(58) Field of Classification Search
CPC ... B25J 9/161; B25J 13/00; B25J 13/02; B25J 13/025; B25J 13/04; B25J 13/06; B25J 13/065; G05B 19/409; G05B 2219/40134; G05B 2219/40138; G05B 2219/40144; G05B 2219/36162; G05B 2219/36157; G05B 2219/40619
See application file for complete search history.

(56) References Cited

U.S. PATENT DOCUMENTS

| | | | |
|---|---|---|---|
| 7,446,752 B2 * | 11/2008 | Goldenberg et al. | ......... 345/156 |
| 8,095,200 B2 | 1/2012 | Quaid, III | |
| 2005/0052852 A1 | 3/2005 | Ono | |

(Continued)

FOREIGN PATENT DOCUMENTS

| | | |
|---|---|---|
| JP | H09-300256 | 11/1997 |
| JP | 200565005 A | 3/2005 |

(Continued)

OTHER PUBLICATIONS

Hoefer, Steve, "Meet the Tacit Project. It's Sonar for the Blind.", Aug. 8, 2011, http://grathio.com/2011/08/meet-the-tacit-project-its-sonar-for-the-blind/.*

*Primary Examiner* — Spencer D Patton
(74) *Attorney, Agent, or Firm* — William J. Clemens; Shumaker, Loop & Kendrick, LLP (57) ABSTRACT

An apparatus for providing haptic feedback to a teach pendant including a teach pendant having a housing and a processor disposed therein. The processor is in signal communication with a robot controller and is configured to monitor and control a robot. At least one haptic device is disposed on the teach pendant. The haptic device is in signal communication with the processor and configured for providing haptic feedback through the teach pendant to a user upon the occurrence of a haptic event.

20 Claims, 4 Drawing Sheets

(56) References Cited

U.S. PATENT DOCUMENTS

| | | |
|---|---|---|
| 2006/0129719 A1* | 6/2006 | Cruz-Hernandez et al. ... 710/58 |
| 2007/0297890 A1 | 12/2007 | Sjoberg et al. |
| 2009/0247216 A1 | 10/2009 | Kamatani et al. |
| 2011/0288667 A1* | 11/2011 | Noda et al. .................... 700/98 |
| 2014/0031983 A1* | 1/2014 | Low et al. .................... 700/257 |

FOREIGN PATENT DOCUMENTS

| | | |
|---|---|---|
| JP | 2007-233817 | 9/2007 |
| JP | 2009-142905 | 7/2009 |
| JP | 2009-239773 A | 10/2009 |
| WO | 2011140704 A1 | 11/2011 |

* cited by examiner

HAPTIC TEACH PENDANT

This application claims priority to U.S. Provisional Patent Application Ser. No. 61/697,600 filed Sep. 6, 2012, hereby incorporated herein by reference in its entirety.

FIELD OF THE INVENTION

This invention relates to teach pendants for robots. More particularly, the invention is directed to an apparatus and method for providing haptic feedback on a teach pendant to alert the operator of some state of the system.

BACKGROUND OF THE INVENTION

A haptic device using the form of force feedback is known in the surgical and telerobotic fields. Typically the haptic devices are in the form of a joystick or similar device held by the operator to guide the motion of the robotic arm. Since the physical position of the control device held by the operator is directly related to the motion of the actuating device, the haptic feedback is directly sensed by the operator.

U.S. Pat. No. 8,095,200 describes a system and method for using a haptic device in computer assisted surgery. The haptic device is used as an input device, allowing information to pass from the user to the computer assisted surgery system. It may be used for defining anatomical reference geometry, manipulating the position and/or orientation of virtual implants, manipulating the position and/or orientation of surgical approach trajectories, manipulating the positions and/or orientation of bone resections, and the selection or placement of any other anatomical or surgical feature. The haptic device is a mechanical or electromechanical device that interacts and communicates with a user using sensory information such as touch, force, velocity, position, and/or torque.

Haptic devices provide users with information through touch and have been incorporated in pagers and are available in modern smartphones. These devices quietly notify the user of events or other occurrences through vibrations of varying strengths, frequencies, and patterns. Other prior art haptic devices that provide users with information through touch include a haptic torque wrench, a force feedback haptic teaching device, a vibrating handheld barcode reader, and a video game controller with "dual shock".

The prior art does not include use of haptic devices in the industrial robot environment and generally is not related to the operation of a teach pendant where keys are pressed to control motion of the robot. The prior art does not relate to notification of contact of the robot with a fixture, or when an overly aggressive robot move is commanded, or when a teach pendant entry mistake was made. The prior art does not relate to notification of approaching an interference zone, a torch angle for a robot utilized for welding, or other tooling angles reaching a specified orientation or position.

Notification devices used with industrial robots include audible alarms which are difficult to hear in a noisy plant environment. Also, visual alarms are used with industrial robots. However, visual alarms are not observed by the user unless the user is looking directly at the teach pendant. Missing a notification of an event or a circumstance can lead to a decrease in productivity including a decrease in quality, an increase of production delay, and an increase in cost.

As a result, there is a need for an apparatus and method to provide haptic feedback for use with industrial robots to improve the interaction between users and their teach pendant to increase productivity and quality and decrease delay and cost.

SUMMARY

In concordance with the instant disclosure, an improved apparatus and method of providing haptic feedback on a teach pendant has surprisingly been discovered.

In an embodiment of the invention, an apparatus for providing haptic feedback to a teach pendant is disclosed. The apparatus includes a teach pendant having a housing and a processor disposed therein, the processor in signal communication with a robot controller, the robot controller configured to monitor and control a robot; at least one haptic device disposed on the teach pendant, the haptic device in signal communication with the processor and configured for providing haptic feedback through the teach pendant to a user upon the occurrence of a haptic event; and a haptic software program in signal communication with the haptic device.

In another embodiment of the invention, an apparatus for providing haptic feedback to a teach pendant includes a teach pendant having a housing and a processor disposed therein, the processor in signal communication with a robot controller, the robot controller configured to monitor and control a robot; at least one haptic device disposed on the teach pendant, the haptic device in signal communication with the processor and configured for providing haptic feedback to a user upon the occurrence of a haptic event; and a haptic software program in signal communication with the haptic device, the haptic software program having a haptic event monitor, a haptic event processor, and a haptic effect generator, wherein the haptic event processor receives a signal from the haptic event monitor at the occurrence of the haptic event and provides a signal to the haptic effect generator to provide a signal to the at least one haptic device.

In a further embodiment of the invention, a method for providing haptic feedback on a teach pendant is disclosed. The method includes the steps of: detecting at least one haptic event through a haptic software program configured for communication with a robot controller, the robot controller configured to control and monitor a robot; sending a signal to a haptic device disposed on the teach pendant, the signal corresponding to the at least one haptic event; and generating the haptic feedback through the teach pendant by the haptic device, the haptic feedback based on the signal received by the haptic device.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
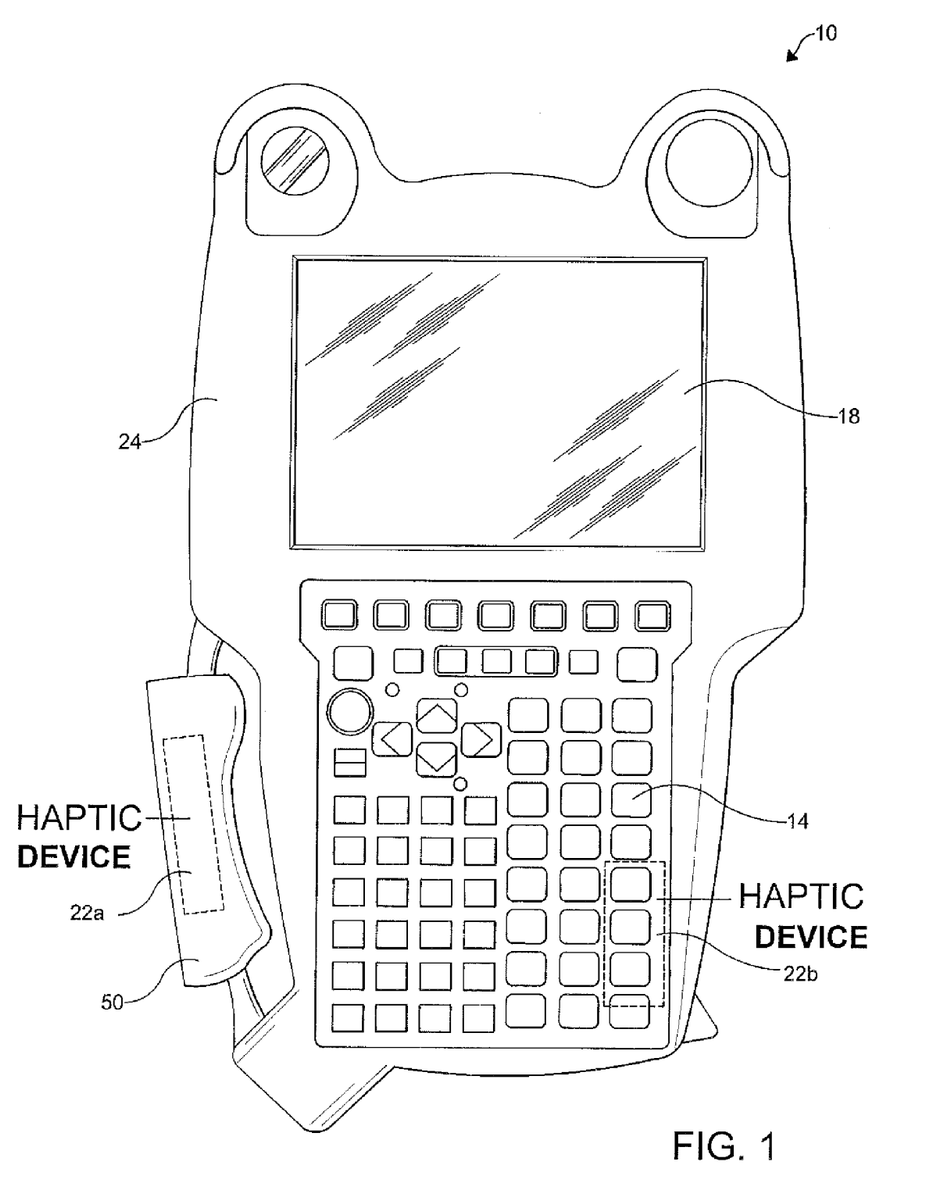
FIG. 1 shows a front elevation view of an exemplary teach pendant according to an embodiment of the present invention.
Figure 2:
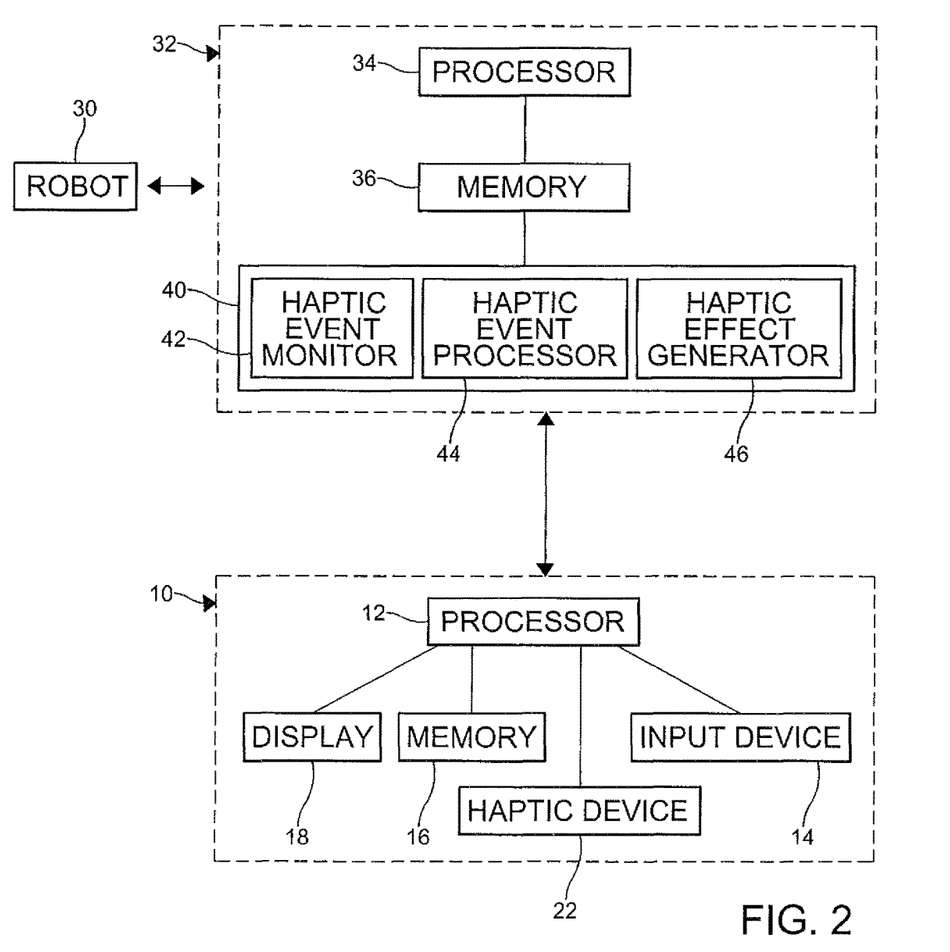
FIG. 2 shows a schematic diagram of a robot system incorporating the teach pendant of FIG. 1.

The invention relates to an apparatus and a method to provide haptic feedback through a robot teach pendant to a programmer, or user, when certain circumstances occur. There is shown in FIG. 1 and FIG. 2 a teach pendant 10 according to an embodiment of the invention. The teach pendant 10 is a user interface configured to control or program a robot 30 to move and includes a processor 12 capable of operating the teach pendant 10. The processor 12 of the teach pendant 10 is coupled to an input device 14 for inputting data, a memory 16 for program and data storage, and a display 18 to provide feedback to the user. The input device 14 can be a keyboard. However, it is understood that the input device 14 can be an interactive display such as a touchscreen that allows a user to interact with the teach pendant 10 or any other device that provides input to the teach pendant 10. The teach pendant 10 shown in FIG. 1 is a hand held device. However, it is understood that the teach pendant 10 can be any user interface device configured to control the robot 30 such as a portable or desktop computer.

As shown in FIG. 2, the teach pendant 10 is configured for wired or wireless communication to a robot controller 32. The robot controller 32 includes a processor 34 and a memory 36 for program and data storage. The robot controller 32 is connected to the robot 30 to actively control and monitor robot activity. In operation, the user can enter a command or data into the input device 14 of the teach pendant 10. The command is communicated to the robot controller 32 which then controls the robot 30 according to the entered commands. The robot controller 32 communicates information with the teach pendant 10 regarding status and position of the robot 30. This information can be provided on the display 18 of the teach pendant 10.

In the embodiment shown in FIG. 1, the teach pendant 10 includes a haptic device 22 disposed thereon. The haptic device 22 is a vibrotactile device such as an actuator that creates mechanical motion in response to an electrical stimulus to apply forces or vibrations to a device that can be felt by the user. The haptic device 22 is incorporated into the teach pendant 10 and configured to provide sufficient vibration that will carry through the teach pendant 10. Therefore, although the vibratory source may not be directly under an area of the teach pendant 10 being held by the user, the vibration will carry though the housing of the teach pendant 10 when activated to provide sensation to the user.

In the embodiment shown, represented by the dashed line, the haptic device 22a can be disposed on the teach pendant 10 in a strap 50 of the teach pendant 10 to create touch sensation to the user upon occurrence of an event. The strap 50 is coupled to the teach pendant 10 to facilitate handling thereof. Additionally, the teach pendant 10 includes a housing 24 configured to retain internal components (not shown) of the teach pendant 10. The haptic device 22b can be disposed within the housing 24 of the teach pendant 10. However, it is understood that the haptic device 22 can be positioned anywhere on the teach pendant 10 to create adequate touch sensation for the user. In a non-limiting example, the haptic device 22 can be disposed exterior of the housing 24 of the teach pendant 10 or disposed at any position on the teach pendant 10 as desired. Additionally, any number of haptic devices 22 can also be included with the teach pendant 10.

The haptic device 22 is configured as an alarm that receives control signals to activate the haptic device 22 to provide a felt sensation to the user who is directly holding the teach pendant 10. The haptic device 22 of the teach pendant 10 allows a visual attention of the user to be directed at the robot 30 in a noisy environment where an audible warning may not be heard, but a vibrational warning will always be felt. The haptic device 22 can be an eccentric rotating mass motor (ERM), linear resonant actuator (LRA), multi-functional actuator (MFA), or any other actuator or motor configured to provide vibrations to a user interface device, for example.

As shown in FIG. 2, the robot controller 32 stores a haptic software program 40 configured for monitoring robot 30 activity for user specified conditions and providing feedback to the haptic device 22. In an embodiment of the invention, the haptic software program 40 can include a haptic event monitor 42, a haptic event processor 44, and a haptic effect generator 46. In operation, for example, the teach pendant 10 provides a haptic system initiation signal to the haptic software program 40 to begin monitoring for a haptic event. The haptic event monitor 42 detects the occurrence of a haptic event, which can be a predetermined movement of the robot 30 or a specific data entry by a user on the input device 14, and provides a signal to the haptic event processor 44 which provides a signal to the haptic effect generator 46. The haptic effect generator 46 provides a signal, through the robot controller 32, to actuate the haptic device 22 to be sensed by the user holding the teach pendant 10. It is understood the haptic software program 40 or portions of the haptic software program 40 can also be stored on the teach pendant 10.

Figure 3A:
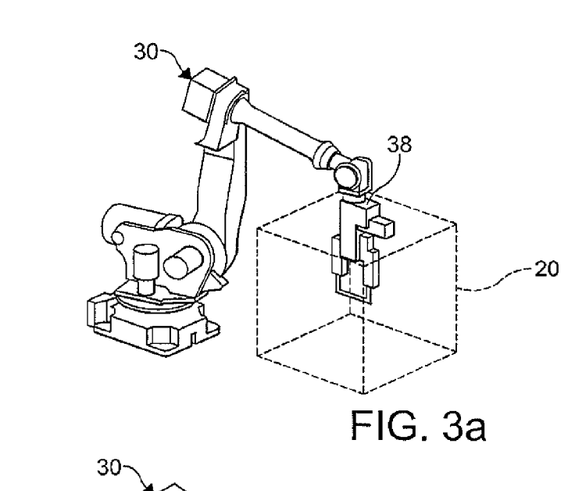
FIGS. 3a-3c show schematic diagrams of exemplary robot conditions in which a teach pendant with a haptic device is used to provide feedback according to embodiments of the invention.
Figure 3B:
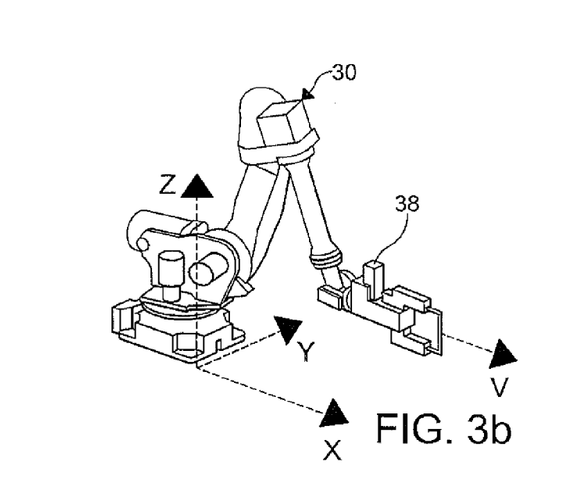
Figure 3C:
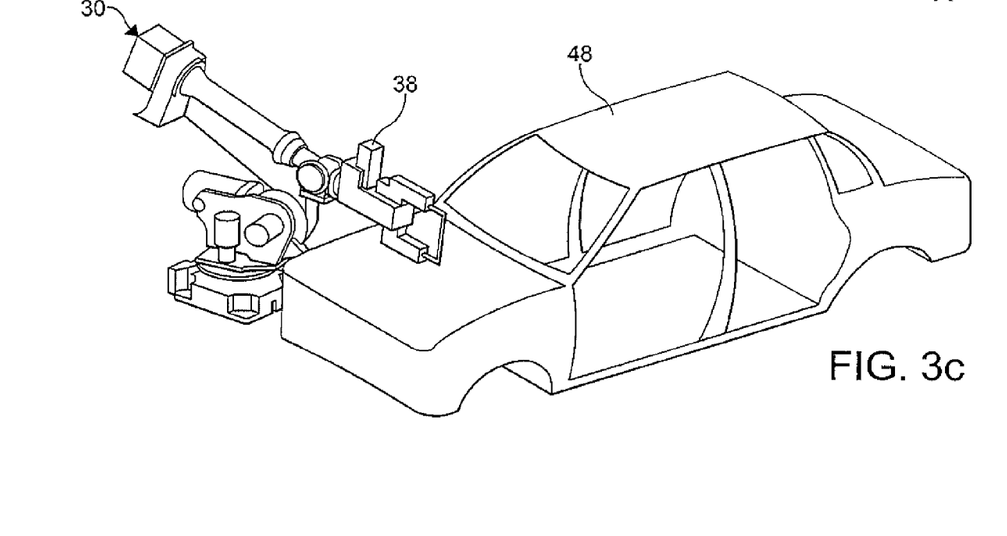

FIGS. 3a-3c shown exemplary robot conditions that can include the haptic teach pendant 10 with the haptic device 22. The teach pendant 10 with the haptic device 22 can be used in accordance with robot speed and robot positioning safety monitoring systems during a jogging or a programmed operation. As shown in FIG. 3a, the teach pendant 10 with the haptic device 22 can be used with the robot 30 that has a robot tool 38 and is programmed to operate within an interference zone 20. The interference zone 20 is a programmed area in which the robot 30 is confined to operate therein and should the robot 30 operate outside the interference zone 20, the robot 30 will slow down or the motor power of the robot 30 will be shut down. When used in accordance with this operation, the haptic device 22 of the teach pendant 10 can be activated when the robot 30 approaches any outer limit of the interference zone 20 within a specified distance. For example, the haptic device 22 can be activated if the robot tool 38 reaches a specified distance of 2 feet within any outer limit of the interference zone 20. However, it is understood that any distance greater or less than 2 feet can be the specified distance. In the embodiment shown, the robot tool 38 is an end of arm tool used for welding operations. However, the robot tool 38 can be any tool used for any robot operation such as material handling, machine tooling, painting, palletizing, or any other industrial robot operation, for example.

The haptic device 22 can also be used to facilitate detection of an overly aggressive robot motion such as being activated if the robot 30 exceeds a specified speed limit. Specifically, if any motor speeds of the robot exceed a specified speed limit then the motor power of the robot will be shut down. The teach pendant 10 with the haptic device 22 can be used in accordance with limit switches, area scanners, light curtains, proximity detectors, pressure mats, safety relays, and any other speed and position monitoring devices to be activated when the robot 30 approaches a system limit.

In another embodiment of the invention, the haptic device 22 can be activated when the robot tool 38 is within a tolerance of a specified orientation. In a non-limiting example, as shown in FIG. 3b, the haptic device 22 can be activated when the robot tool 38 is oriented within a specified orientation of a world coordination or a user frame axes X, Y, Z, such as an when the approach vector V of the robot tool 38 is parallel to an axis of the world coordination or user frame axes. In another non-limiting example (not shown), the haptic device 22 can be activated when used in coordination with a welding robot tool such that the haptic device 22 is activated when the welding robot tool is oriented to create a specified torch angle during a welding operation.

The haptic device 22 can be activated in accordance with any robot speed and positioning applications as desired. For example, in the embodiment shown in FIG. 3c, the haptic device 22 can be activated when contact occurs between the robot 30 and a part 48 or fixture. The part 48 illustrated in the figure is a car body. However, the part 48 can be any part or fixture that a robot may come into contact with during any manufacturing process, tooling process, packaging process, or any other process utilizing a robot. In other non-limiting examples (not shown), the haptic device 22 can be activated when a tool center point (TCP) is near or at a specified position, or when a single step motion of the robot 30 is complete, or when the robot 30 is in motion.

The haptic device 22 can also be activated in accordance with any other events, situations, or conditions as desired that may require haptic feedback be provided to a user. In further examples, the haptic device 22 can be activated upon an improper or incorrect teach pendant entry by the user into the input device 14 or in accordance with an occurrence of a user-defined alarm.

The haptic device 22 is programmable to generate a haptic effect which is a pattern of vibrations or forces to create custom haptic sensations based on the occurrences of one or more haptic events. The patterns may include varying outputs of characteristics of the haptic device 22 such as vibration magnitudes, duration of a vibration, and frequency of the vibration, and any other output characteristics of the haptic device 22, as desired. The haptic software program 40 allows each haptic event to be assigned a custom haptic pattern. One or more haptic devices 22 can be instructed by the robot controller 32 through the haptic software program 40 to provide the custom haptic pattern. In a non-limiting example, upon an overly aggressive robot 30 motion, the one or more haptic devices 22 may output one custom haptic pattern whereas, upon the robot 30 approaching the outer limit of the interference zone 20, the haptic device 22 may output a different custom haptic pattern. However, it is understood that any pattern can be assigned to any haptic event, as desired.

Figure 4:
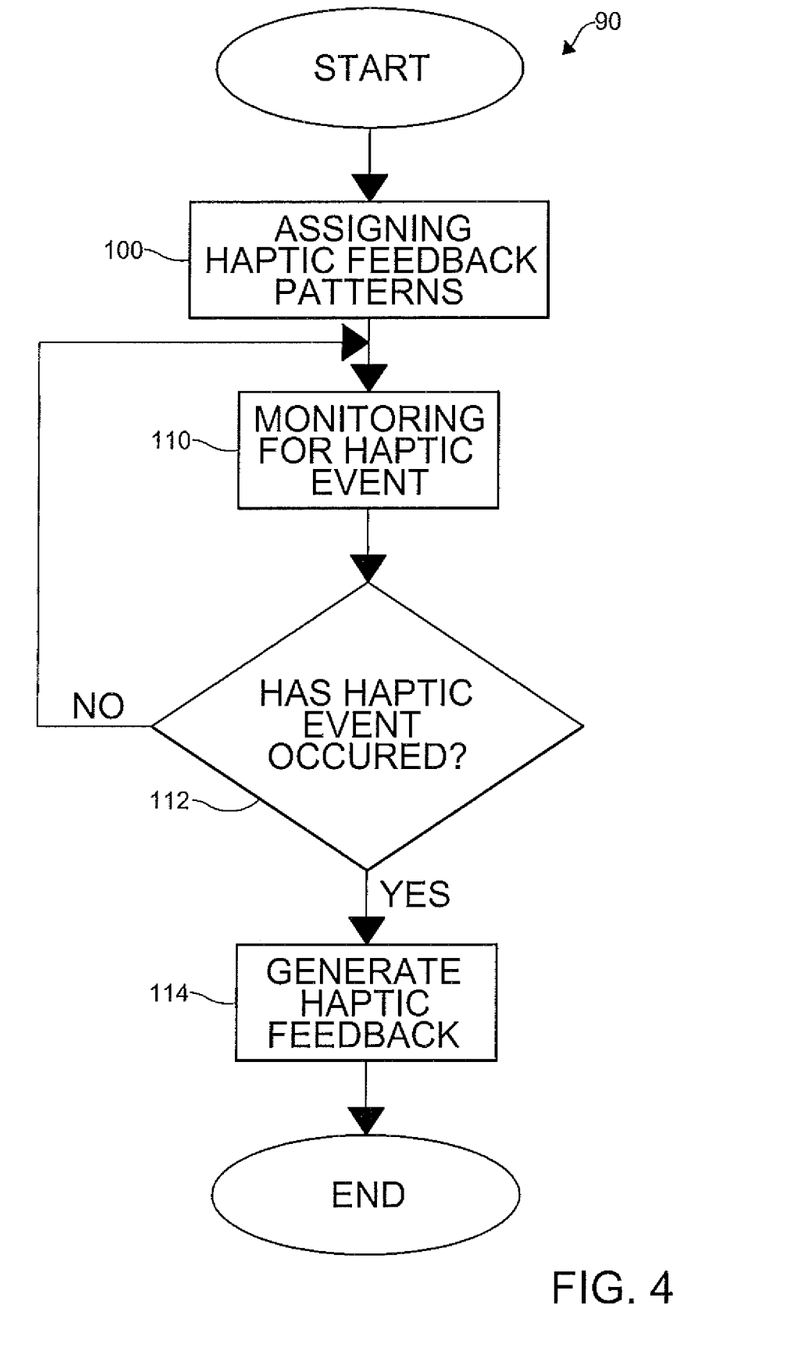
FIG. 4 is a flow diagram of a method for providing haptic feedback.

As shown in FIG. 4, a method 90 for providing haptic feedback according to an embodiment is provided. A user programs the haptic device 22 to provide feedback through the teach pendant 10 by assigning haptic feedback patterns to haptic events, as shown in step 100. The assignment of the haptic feedback patterns to haptic events is provided through the haptic software program 40. The haptic events are any of selectable events, situations, or conditions such as a robot tool approaching an interference zone or robot limit, detection of an overly aggressive robot motion, detection of an orientation of a robot tool within a tolerance of a specified orientation, detection of a tool center point approaching a specified position, contact between the robot and a part or fixture, completion of a single step motion of the robot, occurrence of any motion of the robot, detection of the robot operating outside of an acceptable process range, improper or incorrect teach pendant entry, indication that a user-defined alarm has occurred, or any other event, situation, or condition that may require haptic feedback.

As shown in step 110, the haptic event monitor 42 of the haptic software program 40 monitors for occurrence of the selected haptic event. Upon occurrence of the haptic event as shown in step 112, the haptic event monitor 42 detects the haptic event and communicates with the haptic event processor 44 to process the haptic feedback pattern assigned to the corresponding haptic event detected by the haptic event monitor 42. In step 114, the haptic event processor 44 communicates with the haptic effect generator 46 to send a signal through the robot controller 32 to the haptic device 22 to generate haptic feedback through the teach pendant 10 to a user. The haptic effect generator 46 generates a haptic feedback according to the assigned haptic feedback pattern corresponding to the haptic event so the user can feel the vibration and identify the haptic event that has occurred.

In an embodiment of the invention, the generation of the haptic feedback can include additional cues such as auditory cues and visual cues or any other type of sensory cues as desired to provide feedback to the user. The cues can be incorporated with the teach pendant 10. For example, the visual cue can be displayed on the display 18 of the teach pendant 10 and an auditory cue be generated from the teach pendant 10. It is understood that the cues can be any sensory cues displayed or generated anywhere such as alarms, lights, displays on computers, or any other sensory cue as desired to facilitate providing feedback to a user.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for providing haptic feedback to a teach pendant comprising:
   a teach pendant having a housing and a processor disposed therein, the processor in signal communication with a robot controller, the robot controller configured to monitor, control, and program a robot;
   at least one haptic device disposed on the teach pendant, the at least one haptic device in signal communication with the processor and configured for providing a haptic feedback to a user of the teach pendant upon an occurrence of a haptic event; and
   a haptic software program executed by at least one of the processor and the robot controller for controlling the signal communication between the processor and the robot controller and the signal communication between the processor and the at least one haptic device, the haptic software program detecting the occurrence of the haptic event and controlling generation of the haptic feedback by the at least one haptic device, the haptic feedback based on a plurality of custom haptic patterns assigned to a plurality of conditions, the plurality of conditions including a robot tool approaching an interference zone or a robot limit, and a detection of an overly aggressive robot motion;
wherein the haptic event is the robot tool approaching the interference zone or the robot limit, or the detection of the overly aggressive robot motion.

2. The apparatus according to claim 1, wherein the at least one haptic device is one of an actuator and a vibration motor.

3. The apparatus according to claim 1, wherein the haptic software program is stored in one of the robot controller and the teach pendant.

4. The apparatus according to claim 1, wherein the teach pendant provides a haptic system initiation signal to the haptic software program.

5. The apparatus according to claim 1, wherein the haptic software program includes a haptic event monitor, a haptic event processor, and a haptic effect generator.

6. The apparatus according to claim 5, wherein the haptic event processor receives a signal from the haptic event monitor at the occurrence of the haptic event and provides a signal to the haptic effect generator to provide a signal to the at least one haptic device.

7. The apparatus according to claim 6, wherein the at least one haptic device responds to the signal provided by the haptic effect generator by generating the haptic feedback to the teach pendant to be sensed by the user.

8. The apparatus according to claim 1, wherein the at least one haptic device is disposed within the housing of the teach pendant.

9. The apparatus according to claim 1, the haptic software program having a haptic event monitor, a haptic event processor, and a haptic effect generator, wherein the haptic event processor receives a signal from the haptic event monitor at the occurrence of the haptic event and provides a signal to the haptic effect generator to provide a signal to the at least one haptic device.

10. The apparatus according to claim 9, wherein the at least one haptic device is one of an actuator and a vibration motor.

11. The apparatus according to claim 10, wherein the haptic software program is stored in one of the robot controller and the teach pendant.

12. The apparatus according to claim 9, wherein the at least one haptic device responds to the signal provided by the haptic effect generator by generating a selected haptic feedback in accordance with a predetermined haptic feedback pattern to the teach pendant to be sensed by the user.

13. The apparatus according to claim 9, wherein the at least one haptic device is disposed in one of a strap of the teach pendant and the housing of the teach pendant.

14. The apparatus according to claim 1, wherein:
the plurality of conditions further includes a detection of a tool center point approaching a specified position, a contact between the robot and a part or a fixture, a completion of a single step motion of the robot, an occurrence of any motion of the robot, a detection of the robot operating outside of an acceptable process range, an improper or incorrect teach pendant entry, and an indication that a user-defined alarm has occurred; and
wherein the haptic event is the robot tool approaching the interference zone or the robot limit, the detection of the overly aggressive robot motion, the detection of the orientation of the robot tool within the tolerance of the specified orientation, the detection of the tool center point approaching the specified position, the contact between the robot and the part or the fixture, the completion of the single step motion of the robot, the occurrence of any motion of the robot, the detection of the robot operating outside of the acceptable process range, the improper or incorrect teach pendant entry, or the indication that the user-defined alarm has occurred.

15. The apparatus according to claim 1, wherein the multiple haptic events further include a detection of a tool center point approaching a specified position, a contact between the robot and a part or a fixture, a completion of a single step motion of the robot, an occurrence of any motion of the robot, a detection of the robot operating outside of an acceptable process range, an improper or incorrect teach pendant entry, and an indication that a user-defined alarm has occurred.

16. An apparatus for providing haptic feedback to a teach pendant comprising:
a teach pendant having a housing and a processor disposed therein, the processor in signal communication with a robot controller, the robot controller configured to monitor and control a robot;
at least one haptic device disposed on the teach pendant, the at least one haptic device in signal communication with the processor and configured for providing a haptic feedback to a user of the teach pendant upon an occurrence of a haptic event wherein the at least one haptic device is disposed in a strap of the teach pendant; and
a haptic software program executed by at least one of the processor and the robot controller for controlling the signal communication between the processor and the robot controller and the signal communication between the processor and the at least one haptic device.

17. A method for providing haptic feedback on a teach pendant comprising the steps of:
detecting multiple haptic events through a haptic software program configured for communication with a robot controller, the robot controller configured to monitor, control, and program a robot, each haptic event including a predetermined movement of the robot or a specific data entry by the user on the teach pendant;
sending a signal to a haptic device disposed on the teach pendant, the signal individually varying for each of the multiple haptic events such that different custom haptic patterns are output for each of the multiple haptic events to differentiate between the multiple haptic events, the multiple haptic events including a robot tool approaching an interference zone or a robot limit, and a detection of an overly aggressive robot motion; and
generating a haptic feedback through the teach pendant by the haptic device, the haptic feedback based on the signal received by the haptic device.

18. The method according to claim 17, including the step of assigning the haptic patterns to the haptic events through the haptic software program.

19. The method according to claim 17, wherein the multiple haptic events further include two or more of:
an orientation of a robot tool within a tolerance of a specified orientation;
a contact between the robot and a part;
a completion of a single-step motion of the robot;
an occurrence of a motion of the robot;
a detection of the robot operating outside of an acceptable process range;
an incorrect teach pendant input entry; and
an occurrence of a user-defined alarm.

20. The method according to claim 17, wherein the haptic software program includes a haptic event monitor, a haptic event processor, and a haptic effect generator, wherein the haptic event processor receives a signal from the haptic event monitor at the occurrence of the multiple haptic events and provides a signal to the haptic effect generator to provide a signal to the haptic device.

* * * * *